US006129871A

United States Patent [19]

Suzuki et al.

[11] Patent Number: 6,129,871

[45] Date of Patent: Oct. 10, 2000

[54] MANUFACTURING METHOD FOR A WOOD BOARD

[75] Inventors: Satoshi Suzuki; Shigeki Kataoka; Kaneo Ohmoto; Ritsuo Iwata, all of Hamamatsu, Japan

[73] Assignee: Yamaha Corporation, Japan

[21] Appl. No.: 08/854,154

[22] Filed: May 9, 1997

[51] Int. Cl.$^{7}$ .......................... B29C 44/06; B29C 43/20

[52] U.S. Cl. .......................... 264/51; 264/54; 264/112; 264/113; 264/320

[58] Field of Search .......................... 264/112, 113, 264/51, 320, 54

[56] References Cited

U.S. PATENT DOCUMENTS

| | | | |
|---|---|---|---|
| 3,668,286 | 6/1972 | Brooks et al. | 264/451 |
| 3,900,334 | 8/1975 | Brink | 264/124 |
| 3,983,084 | 9/1976 | Alexander et al. . | |
| 4,102,975 | 7/1978 | Doerer | 264/320 |
| 4,325,899 | 4/1982 | Cole et al. | 264/320 |
| 4,358,418 | 11/1982 | Heggenstaller | 264/320 |
| 4,411,738 | 10/1983 | Wittrup et al. | 162/142 |
| 4,469,655 | 9/1984 | Kiss | 264/82 |
| 4,684,489 | 8/1987 | Walter | 264/101 |
| 4,913,872 | 4/1990 | Kiss | 264/320 |
| 4,923,656 | 5/1990 | Held | 264/83 |
| 4,960,553 | 10/1990 | DeBruine et al. | 264/320 |
| 4,976,905 | 12/1990 | Brown | 264/320 |
| 5,002,713 | 3/1991 | Palardy et al. | 264/109 |
| 5,344,484 | 9/1994 | Walsh | 264/126 |
| 5,554,429 | 9/1996 | Iwata et al. | 428/105 |

FOREIGN PATENT DOCUMENTS

| | | |
|---|---|---|
| 0172930 | 8/1984 | European Pat. Off. . |
| 7-232309 | 9/1995 | Japan . |

*Primary Examiner*—Allan R. Kuhns
*Attorney, Agent, or Firm*—Ostrolenk, Faber, Gerb & Soffen, LLP

[57] ABSTRACT

A wood board of sufficient strength which demonstrates high dimensional stability and little warping can be obtained, while the production process therefor is simplified and may be carried out in less time and at a lower cost as compared to conventional methods by means of a method for producing a wood board comprising the steps of shaving lumber to produce wooden strands; applying a binder to the wooden strands; subjecting the binder coated wooden strands to a forming process to form a preformed material 1; and carrying out a steam injection pressing in which the preformed material 1 is subjected to thermal compression molding while being moisturized so as to obtain a molded material having a water content of 5 to 15%; as well as by means of a method for producing a wood board, comprising the steps of shaving lumber to produce wooden strands; applying a binder to the wooden strands after adjusting the water content of the wooden strands to 10 to 25%, or, alternatively, adding water when applying the binder to the wooden strands so that the water content is in the range of 10 to 25%; and subjecting the binder coated wooden strands to a forming process to form a preformed material 1; and carrying out thermal compression molding of the preformed material 1 to obtain a molded material having a water content of 5 to 15%.

8 Claims, 5 Drawing Sheets

MANUFACTURING METHOD FOR A WOOD BOARD

BACKGROUND OF THE INVENTION

1. Field of the Invention

The present invention relates to a manufacturing method for a wood board, and more particularly, to a manufacturing method for a wood board which provides a wood board of sufficient strength in which there is little warping and a high degree of dimensional stability, the production process therefor being simpler and requiring less time and expense.

2. Background Art

The insufficiency of lumber resources and the conservation of forests have become problematic in recent years, and it is clear that it will become increasingly difficult to obtain timber from forests. Accordingly, the supply of board materials such as plywood, which are produced using large amounts of raw lumber, will become unstable or insufficient, with the cost thereof also expected to rise greatly. Thus, wood boards which can be obtained from the efficient use of wooden strands or ligneous fibers of wooden pieces, or the like, which were conventionally regarded as waste materials, have attracted attention, and the use of such wood boards in various applications strongly desired.

Among such wood boards, fiber boards formed from ligneous fibers and strand boards formed from wooden strands are known. Commonly, in cases where ligneous fibers or other materials having small dimensions are employed, the wood board which is obtained is uniform, and the surface thereof is smooth; however, the strength and rigidity of the wood board are not sufficient. On the other hand, in the case of strand boards which employ wooden strands, the strands employed are larger than ligneous fibers, so that the strength and density of the obtained board can approach that of natural lumber.

These wood boards are produced by applying binder to a raw material such as ligneous fibers or wooden strands, and subjecting the material to forming and thermal compression molding. However, because the molded material obtained by the conventional molding process had a low water content, a considerable degree of warping could occur after shipping. Accordingly, the dimensional stability of such conventionally manufactured boards was poor, while the quality thereof could not be guaranteed. Therefore, in order to adjust the water content of the obtained wood board, a moisturizing step is necessary to increase the water content by moisturizing the molded material. Various moisturizing methods are available, such as a method wherein the molded material is placed inside an artificial drying chamber or a chamber in which temperature and moisture are regulated; a method wherein the molded material is soaked in water; a method wherein the molded material is coated with water using a sprayer; or a steam injection method for which the present inventors submitted a patent application ("Manufacturing Method for a wood board", Japanese Patent Application, First Publication, Hei. 7-232309). Because strand boards produced as described above have considerable surface irregularity, a smoothing step to smooth the surface of the board by sanding or the like is necessary. Accordingly, a large number of steps and considerable trouble, are involved in the conventional manufacturing methods for wood boards, which necessitates a longer production time and higher costs.

Furthermore, the method of placing the molded material in an artificial drying chamber or a chamber in which temperature and moisture are regulated requires a large space in order to carry out the moisturizing step. In the manufacturing method for a wood board according to Japanese Patent Application, First Publication, Hei 7-232309, after moisturizing the molded material and adjusting the water content once, it is necessary to provide a step in which the water content is lowered by drying the wood board in order to correct plastic deformations which remain inside the wood board. Further, more time is required since the wood boards must be left at room temperature for a long period of one to two weeks in order to stabilize the water content, presenting a hindrance to reducing the required manufacturing time.

SUMMARY OF THE INVENTION

Accordingly, it is the object of the present invention to provide a manufacturing method for a wood board which enables a simplified production process, shorter manufacturing time and lower production costs, the method providing wood boards of sufficient strength which have a high level of dimensional stability and little warping.

In order to resolve the above described problems, a first aspect of the present invention employs a manufacturing method for a wood board consisting of the steps of shaving lumber to form wooden strands; coating the woods strands with a binder; subjecting the binder coated wooden strands to forming; and carrying out a steam injection pressing step in which the binder coated wooden strands undergo thermal compression molding and moisturizing, to obtain a molded material with a water content in the range of 5 to 15%.

In order to resolve the above described problems, a second aspect of the present invention employs a manufacturing method for a wood board in accordance with the first aspect of the present invention as described above, wherein, prior to carrying out the steam injection pressing step, binder is applied to wooden strands after the water content of the ligneous strands has first been adjusted to 5 to 20%, or, alternatively, water is added to the wooden strands when applying the binder so that the water content thereof is in the range of 5 to 20%.

In order to resolve the above described problems, a third aspect of the present invention employs a manufacturing method for a wood board comprising the steps of shaving lumber to form wooden strands; applying the binder to the wooden strands after adjusting the water content of the wooden strands to be in the range of 10 to 25% or, alternatively, adding water to the wooden strands when applying the binder so that the water content of the wooden strands is in the range of 10 to 25%; subjecting the binder coated wooden strands to forming; and carrying out a molding step in which the wooden strands are subjected to thermal compression molding to obtain a molded material having a water content in the range of 5 to 15%.

In the first aspect of the present invention, a molded material with a water content in the range of 5 to 15% is obtained by shaving lumber to form wooden strands; applying the binder to the woods strands; subjecting the binder coated wooden strands to forming; and carrying out a steam injection pressing step in which the binder coated wooden strands undergo thermal compression molding and moisturizing. Accordingly, the steps of thermal compression molding and adjustment of the water content of the wooden strands, which have been subjected to forming, are carried out together. In addition, unlike conventional methods, this method does not require a smoothing step to eliminate irregularities on the surface of the wood board by sanding, etc., nor a step to stabilize the water content of the wood board by leaving it at room temperature for a long period of time. As a result, the manufacturing method for a wood board according to the present invention is easily carried out on a production line, while the production process is simplified and the time and cost of manufacturing are reduced. Moreover, because the water content of the molded material obtained in the manufacturing method for a wood board according to a first aspect of the present invention is in the range of 5 to 15%, it is possible to obtain a wood board of sufficient strength which has a high level of dimensional stability and experiences little warping after shipping. Additionally, the same effects are obtained in the case where the water content is adjusted by adding water at the time of applying the binder, in addition to adjusting the water content through a steam injection pressing step.

In a second aspect of the present invention, prior to carrying out the steam injection pressing step, binder is applied to the wooden strands after first adjusting the water content of the ligneous strands to 5 to 20%, or, alternatively, water is added to the wooden strands when applying the binder so that the water content is in the range of 5 to 20%. As a result, a wood board having a water content in the range of 5 to 15% following the steam injection pressing step is readily obtained. Further, it is possible to reduce the duration of the steam injection process in this second aspect of the present invention if all other conditions for the steam injection pressing step here are identical to the conditions set forth for the manufacturing method for a wood board according to the first aspect of the present invention.

The manufacturing method for a wood board according to the third aspect of the present invention eliminates the need for a smoothing step to remove irregularities in the surface of the wood board by sanding, etc., and a step to stabilize the water content by leaving the wood board at room temperature for a long period of time, as required in conventional manufacturing methods for wood boards. As a result, the manufacturing process can be simplified, and the time and cost of production can be reduced. Further, by applying a binder to the wooden strands after first adjusting the water content of the wooden strands to 10 to 25%, or, alternatively, adding water to the wooden strands when applying the binder so that the water content of the wooden strands is in the range of 10 to 25%, and then carrying out a molding step, a wood board which has a water content in the range of 5 to 15% after molding is readily obtained.

DESCRIPTION OF THE PREFERRED EMBODIMENTS

Figure 1:
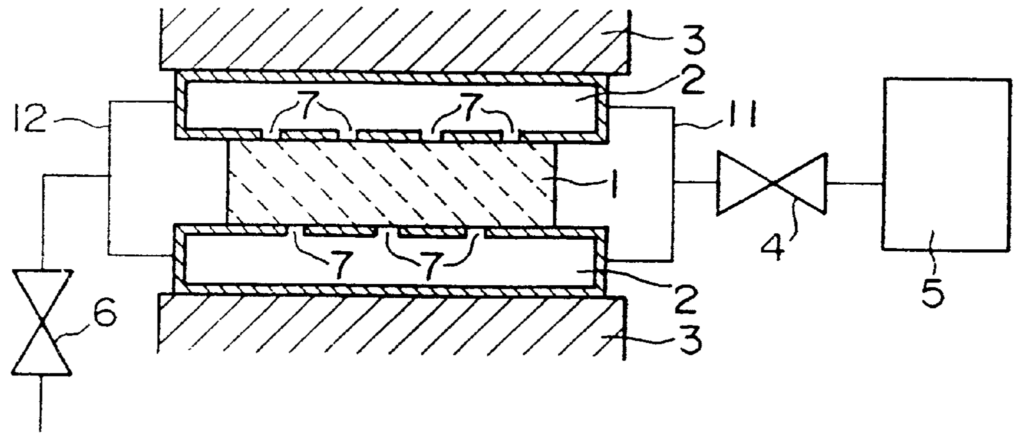
FIG. 1 shows an example of a preferred device for carrying out thermal compression molding and moisturizing in the steam injection pressing step in the manufacturing method for a wood board according to the present invention.

An explanation of embodiments of the manufacturing method for a wood board according to the present invention will now be made, beginning with the first embodiment thereof.

The manufacturing method for a wood board according to the first embodiment of the present invention is shown in Table 1, At first, wooden strands are shaved from material lumber. The material lumber is typically prepared by desiccating unseasoned timber having a water content of 120 to 300% until the water content reaches the level of 0 to 3%. The material lumber used here is not particularly limited, and a material wood or a small diameter wood from a coniferous tree, such as Japanese red pine, larch, spruce, white fir, lodgepole pine, radiata pine, cedar, slash pine, eucalyptus, acacia, albizza, southern yellow pine, yellow cedar, red cedar, pinaster, rubber tree, and the like, or from a broadleaf tree such as aspen may be suitably employed. Alternatively, scraps discarded as waste material from lumber mills or lumber processing facilities may also be suitably employed. As necessary, the material lumber may be dressed, supplied to a shaving machine or other cutting machine, and cut to produce wooden strands. No particular limitations are applied to the length, width or thickness of the wooden strands produced here, but rather these parameters may be appropriately adjusted according to the application of the wood board and the characteristics required thereof.

Next, a binder is applied to these wooden strands. While the application method is not particularly limited, a spray method is preferably employed. For example, a method wherein the wooden strands are placed inside a rotating drum which rotates at low speed, and binder is spray coated as the wooden strands tumble within the drum, or a like method, may be suitably employed.

TABLE 1

| Fabrication Steps (Embodiment 1) |
|---|
| 1. Providing strands |
| 2. Applying binder to the strands |
| 3. Forming (orienting and laminating) the strands to provide preformed material |
| 4. Steam-injection-pressing the preformed material (a water content in a wood board is adjusted to 5–15% upon the completion of the pressing) |

The binder which is applied here may comprise a foaming binder, a non-foaming binder, or a mixture thereof. However, in the case where a decrease in the density of the wood board is a primary desire, it is preferable to use a foaming binder as the main component. In contrast, when improved releasability from the thermal compression plate used for molding and improved durability of the wood board are considerations, then it is preferable that a non-foaming binder be partially incorporated into the foaming binder.

The term "foaming binder" as employed here is meant to indicate a binder which bonds together wooden strands in the wood board and which itself creates foam. Preferably, the binder is one in which the resin component is left only at the intersection of individual wooden strands, expanding the small spaces between the wooden strands with foam cells, so that the density of the wood board and the amount of resin component employed is reduced.

This foaming binder may comprise a self-foaming resin, or may comprise a non-foaming resin and a foaming agent.

Examples of self-foaming resins include foaming polyurethane resin, preferably, isocyanate type resins, and even more preferably, a mixture in which crude MDI (polymethylene diphenyl diisocyanate) is mixed into these resins. When foaming polyurethane resins, and in particular isocyanate type resins, are employed, a reaction with water readily occurs. Since terminal isocyanate groups (—NCO) react with water, causing foaming, the reaction time becomes faster, reducing the pressing duration. Further, when polymethylene diphenyl diisocyanate is mixed in with the above mentioned resins, the adhesive strength of the binder becomes greater. Additionally, by adding and mixing polymethylene diphenyl diisocyanate to the phenol resin, a tough binder is formed, while mold releasability is also improved.

Examples of the non-foaming resins which are made to foam by using a foaming agent include polystyrene resin, epoxy resin, polyvinyl chloride resin, phenol resin, urea resin, or mixtures thereof. Examples of foaming agents include volatile foaming agents, for example, $CCl_3F$, $CCl_2F_2$, and $CCl_2F$—$CClF_2$, or pyrolytic foaming agents, for example, azodicarbon amide, axohexahydrobenzonitrile, 2,2'-azoisobutyronitrile, benzenesulfohydrazide, and N,N'-dinitroso-N,N'-dimethylterephthalamide, or the like.

Examples of non-foaming binders include urea resins, melamine resins, phenol resins, tannin, tannin resins, lignin resins, and the like, and the combinations thereof.

When using a combination of a foaming binder and a non-foaming binder, it is preferable that the mixing ratio be in the range of 4:1 to 1:4. However, the mixing ratio is not limited to this range, but may be suitably adjusted in view of the density and mold releasabilily desired of the wood board.

The amount of binder applied to the wooden strands is preferably in the range of 5 to 15 parts by weight with respect to 100 parts by weight of the wooden strands.

When applying the binder to the wooden strands, water may be added and moisturizing carried out to adjust the water content of the wooden strands as necessary.

The wooden strands coated with the binder as described above are then subjected to forming. In the present application, the forming means a step for orienting a layer of strands and laminating layers of oriented strands. In the manufacturing method for a wood board according to the present invention, it is preferable to employ a dry forming method wherein the binder coated wooden strands are dispersed over a heating plate or a wire netting. Methods and devices conventionally employed may be used without modification in this forming process. Further, the direction of orientation of the wooden strands is not particularly restricted, however, in order to improve the strength of the wood board, it is preferable to arrange the grain direction of the woods strands to be oriented in basically the same direction.

In the manufacturing method for a wood board according to the present invention, a steam injection pressing step, which will be described below, is carried out after the forming step. In the steam injection pressing step, wooden strands subjected to forming (hereinafter, referred to as "preformed material") undergo thermal compression molding and moisturizing, to obtain a molded material in which the water content is adjusted in the range of 5 to 15% upon the completion of the pressing treatment. More specifically, the preformed material is placed inside a steam injection pressing apparatus and subjected to thermal compression and moisturizing. Moreover, it is particularly preferable to perform thermal compression and moisturizing by means of a steam injection pressing method.

Figure 2:
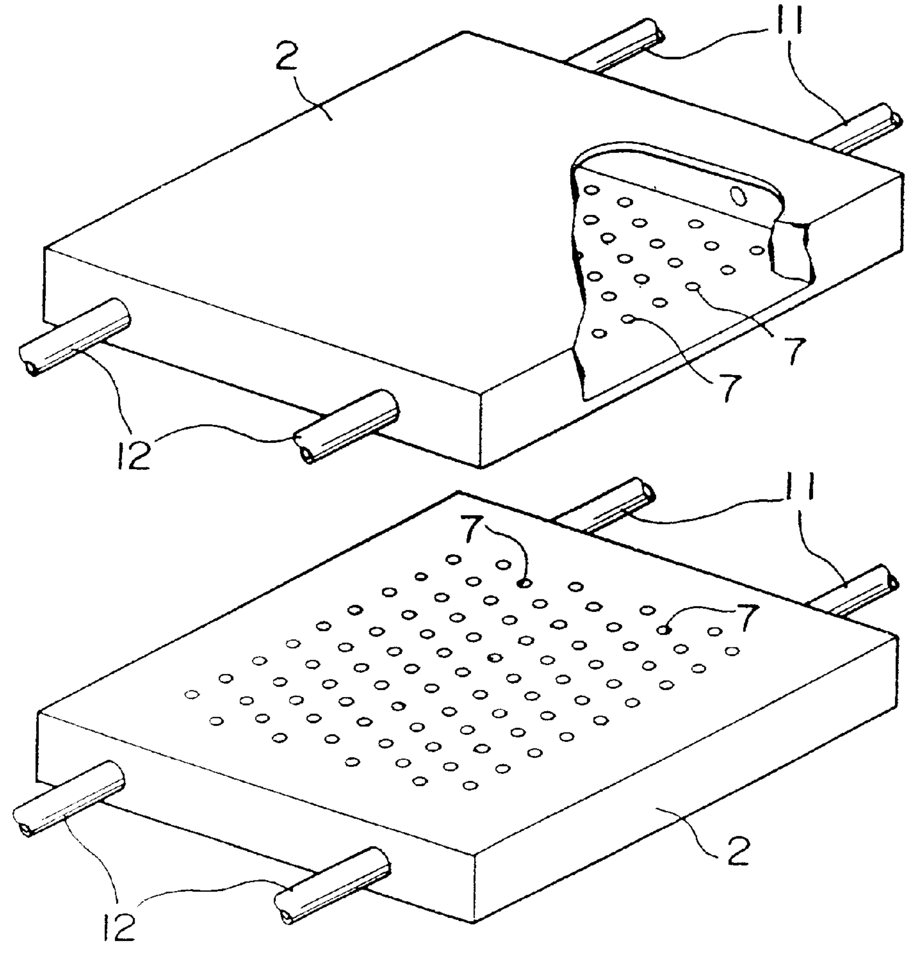
FIG. 2 shows the structure of the steam injection plate employed in the device shown in FIG. 1.

FIG. 1 shows an example of a steam injection pressing apparatus suitably employed to carry out thermal compression and moisturizing of a wood board in a steam injection pressing method. In the figure, the reference numeral 2 indicates two hollow plate-like steam injection plates consisting of a material having a large heat capacity, such as stainless steel, these steam injection plates 2 designed so that a preformed material 1, which will be subjected to thermal compression and moisturizing, can be sandwiched therebetween. Further, as shown in FIG. 2, these steam injection plates 2 have steam injection apertures 7 formed in one surface thereof. The steam injection plates 2 can be disposed in a layered unit with the preformed material 1 so that the surface of a steam injection plate 2 in which these steam injection apertures 7 are formed can be in contact with the preformed material 1, which is to be subjected to thermal compression and moisturizing. Further, a layered unit of steam injection plates 2 and preformed material 1 is compressed by means of two heating plates 3, and thus fixed in place. These two heating plates 3 are provided so as to be able to move toward and away from each other, with the layered unit provided sandwiched between the two heating plates 3. Further, piping 11 from a steam generating apparatus 5 is connected to steam injection plate 2 via a valve 4, with steam being provided to the hollow portion of steam injection plate 2. Steam injection plate 2 is formed of a material having a high heat capacity, so that heat from the heating plate 3 is transmitted to steam injection plate 2, thereby heating the high pressure steam supplied into steam injection plate 2. Drain piping 12 is connected to steam injection plate 2. By opening a valve 6 provided to drain piping 12, the steam inside the hollow portions of steam injection plate 2 can be discharged.

In this type of steam injection pressing apparatus, the thermal compression and moisturizing of a preformed material 1 is carried out as follows. First, a preformed material 1 is sandwiched between two hollow plate-like steam injection plates 2 which have already been set respectively on two heating plates 3, with this layered unit compressed by the two heating plates 3 and fixed in place. At the same time, with valve 6 which is provided to drain piping 12 closed, valve 4 is adjusted to supply high pressure steam from a steam generating apparatus 5, such as a boiler, to steam injection plate 2 via piping 11. Heat from heating plate 3 is transmitted to steam injection plate 2, heating the steam introduced into the hollow portions of steam injection plates 2, with the steam injected via injection apertures 7 formed in steam injection plate 2 due to the rise in pressure thereof.

Accordingly, prepared molded material 1 is subjected to thermal compress on and moisturizing at both surfaces from the high temperature-high pressure steam which is injected via injection apertures 7 of the steam injection plates 2 which are disposed at both surfaces thereof. Moisturizing in the steam injection pressing method described here is preferably carried out until the water content of the wood board obtained is adjusted in the range of 5 to 15% upon the completion of the pressing treatment, and preferably, in the range of 6 to 15% upon the completion of the moisturizing treatment. If the water content of the wood board is in the range of 5 to 15% upon the completion of the moisturizing treatment, a smoothing treatment (such as sanding, grinding, or the like), which was necessary in conventional technologies, becomes unnecessary.

Here, the temperature of the heating plates 3 is in the range of 150 to 230° C., and preferably, in the range of 180 to 200° C., while the duration of pressing is set to 30 to 300 seconds in the case where obtaining a molded material having a thickness of 12 to 13 mm, for example, and preferably is of a time duration calculated by multiplying the desired thickness (mm) of the molded material by 3 to 13 (sec). The pressing pressure here is set to be in the range of 1 to 4 MPa, and preferably in the range of 2 to 3 MPa, and the pressure of the steam is set to be in the range of 0.2 to 0.6 MPa. The duration of steam injection is in the range of 10 to 300 seconds, and preferably in the range of 20 to 60 seconds.

Steam injection may be carried out at the start of, during, or immediately after, thermal compression, or over a combination of these periods. The "start of thermal compression" is meant to indicate when heating plates 3 begin to operate, while the "end of thermal compression" is meant to indicate when heating plates 3 are completely released.

When the temperature of heating plates 3 is less than 150° C., the steam cools, while when the temperature of heating plates 3 exceeds 230° C., the water component evaporates, causing the water content of the obtained wood board (molded material) to be less than the targeted water content.

However, the steam pressure, the duration of steam injection, and the temperature of heating plates 3 can be suitably adjusted in response to conditions such as the thickness and moisture absorption of the preformed material which is to be subjected to pressurization and moisturizing, the number and size of the injection apertures formed in the steam injection plates, or the desired thickness and density of the wood board.

It is preferable that the injection apertures 7 formed in one steam injection plate 2 and the injection apertures 7 formed in the other steam injection plate 2 be formed in such a manner so as not to be in mutual opposition, namely to be formed in an asymmetrical manner, when steam injection plates 2,2 are disposed in opposition to each other. By forming injection apertures 7 to be mutually asymmetrical, the occurrence of irregularities in moisturizing becomes less likely, improving the effectiveness of the moisturizing process.

Further, while not shown in the figures, the surface of steam injection plate 2 which is in contact with heating plate 3 may be provided with a means to regulate temperature, for example, a water cooling mechanism, so that the temperature of steam injection plate 2 can be adjusted.

In addition, a seal material which is formed in a shape which will enclose preformed material 1, and which has a thickness which is slightly larger than preformed material 1 may be disposed between steam injection plates 2,2, so that the steam may be sealed inside the space enclosed by the seal material during moisturizing, so that the amount of steam used may be reduced.

The following experiments form the basis for carrying out moisturizing in the steam injection pressing method until the water content of the obtained wood board is adjusted in the range of 5 to 15% upon the completion of the pressing treatment.

The relationship between water content and amount of warping was examined in warping experiments in which the water content of the wood board was varied and the amount of warping which occurred was measured. Boards 12 mm thick, 1818 mm long and 303 mm wide were processed as material for flooring, after which test pieces were prepared. These test pieces were then placed in an upright position so as to partition an area into a chamber A, which was maintained at 35° C. and 90% humidity, and a chamber B, which was maintained at 35° C. and 20% humidity. The test pieces were left undisturbed for 48 hours, after which a check was made of the amount of warping. The results revealed that the water content necessary for satisfying the standard necessary for using the wood boards as flooring material (warping in the range of −11 mm to 0 mm, with respect to a board of length 1818 mm) is in the range of 4.5 to 12%, and in the range of 6 to 12% when satisfying a stricter standard for using the wood boards as flooring material (warping in the range of −9 mm to 0 mm, with respect to board of length 1818 mm). These results are shown in FIG. 3, which is a graph showing the dependence of warping on water content.

Next, the relationship between water content and the flexural Young's modulus of the wood board was examined by using bending experiments to measure the strength of the wood board as water content varied. The water content which provides boards of satisfactory strength to be used as flooring material (flexural Young's modulus of $35\times10^2$ MPa or higher) was 16% or less, while the water content which provides boards of an even more preferable strength (flexural Young's modulus of $45\times10^2$ MPa or more) was 10% or less. These results are shown in FIG. 4, which is a graph showing the relationship between water content and flexural Young's modulus.

Figure 3:
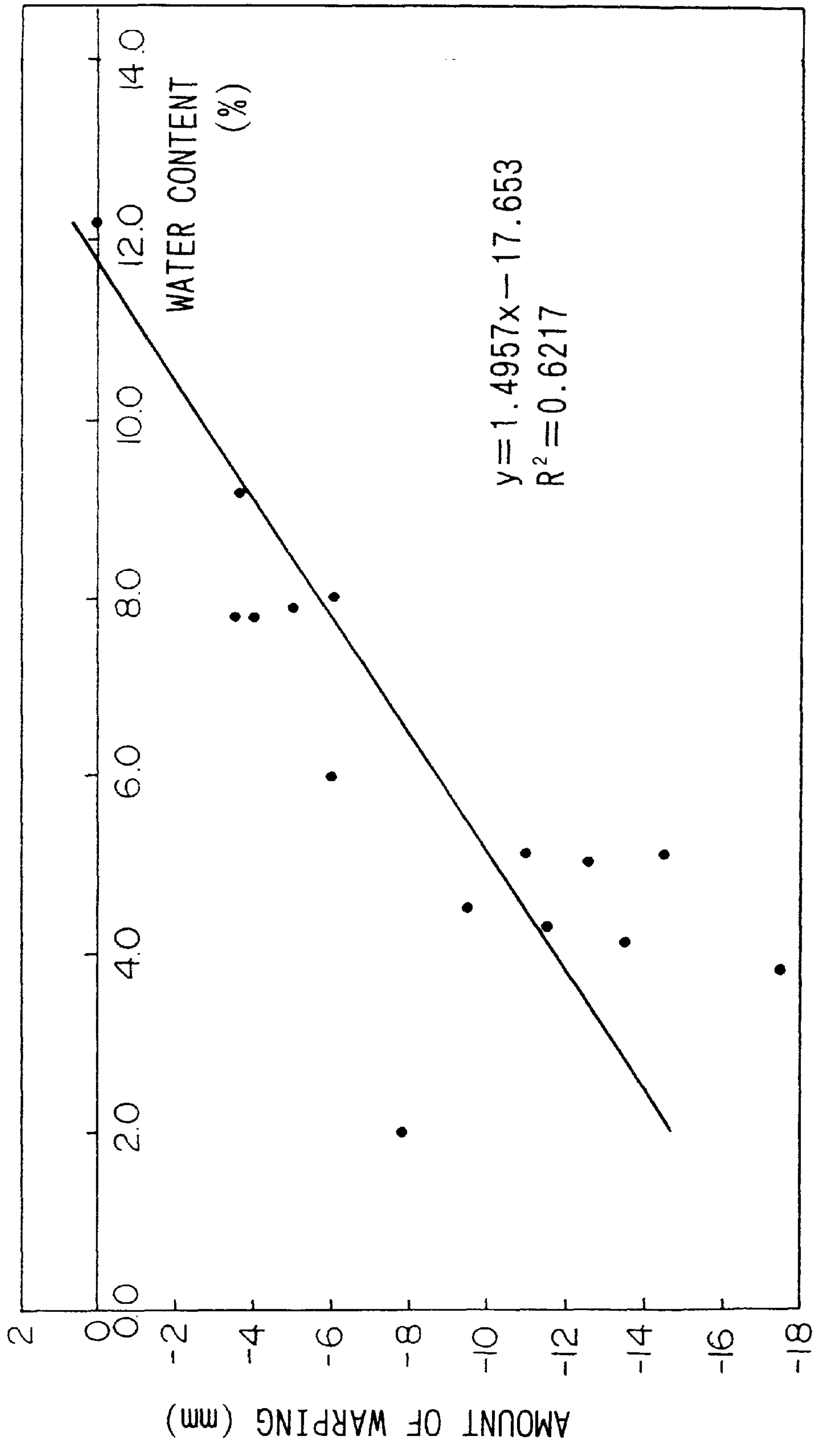
FIG. 3 is a graph showing the dependence of warping on water content.
Figure 4:
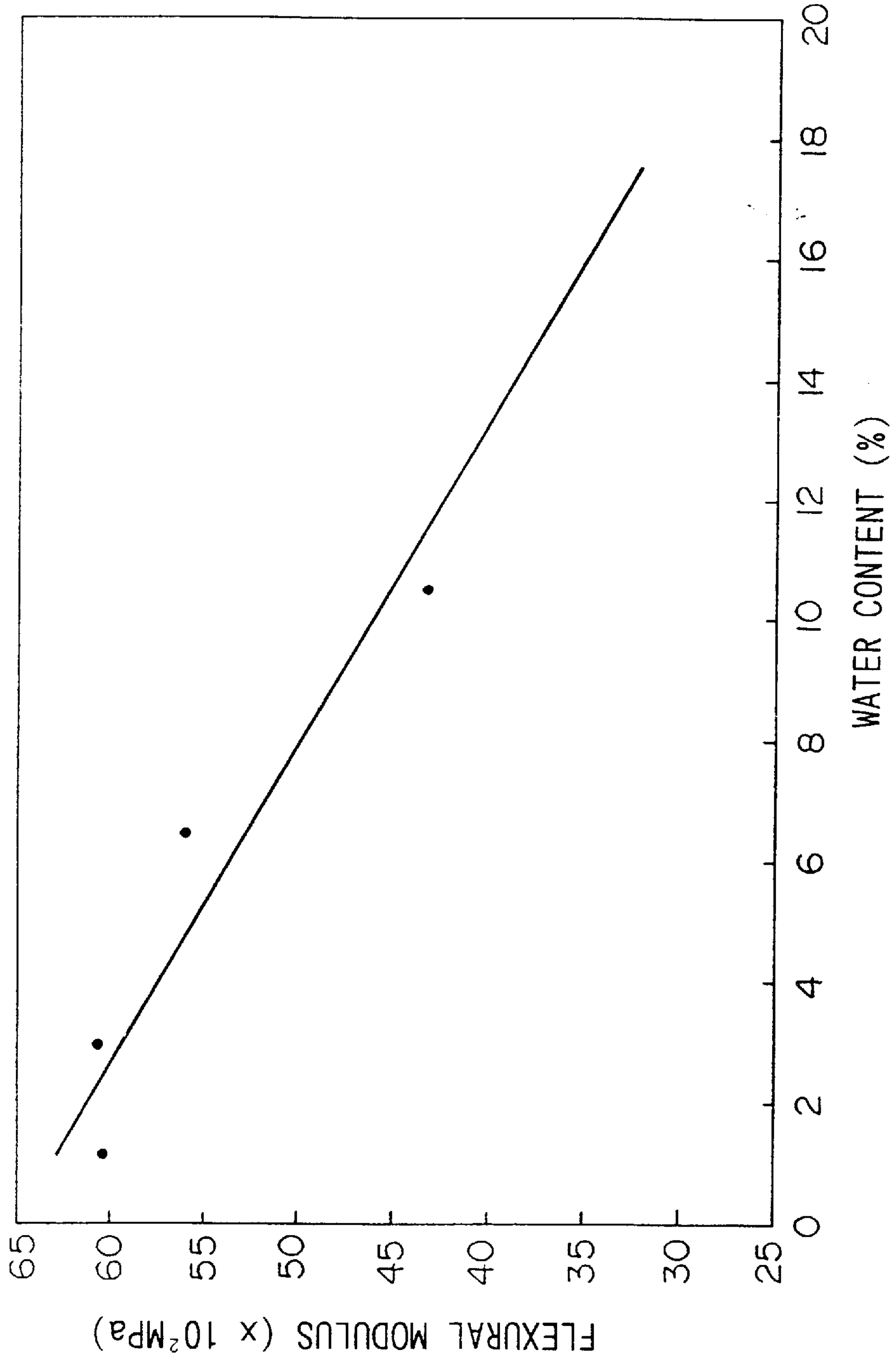
FIG. 4 is a graph showing the relationship between the water con tent of the wood boards and the flexural Young's modulus.

From the results shown in FIGS. 3 and 4, it is clear that the water content of the molded material be in the range of 5 to 15%, and, preferably, in the range of 6 to 15%, in order to obtain a wood board which demonstrates sufficient strength and minimal warping after shipping.

The steam injection pressing method described above employs high temperature, high pressure steam, with the steam forcibly permeated into preformed material 1, so that moisturizing is carried out effectively, making it possible to sharply reduce the duration of moisturizing. Further, since the preformed material is subjected to thermal compression and molding at the same time, a wood board (molded material) of the desired shape is obtained, while the surface irregularities of the wood board are slight. According to the present invention, the water content of the wood board is adjusted to be in the range of 5 to 15% upon completion of the thermal compression. Since the water content in the wood board, adjusted to such a range, is approximately equal to equilibrium moisture content (referred to as "EMC" hereinafter) in the atmosphere, the aged deterioration due to swelling is rare so that irregularities also rarely arise. As a result, a smoothing step in which sanding or the like is carried out to remove surface irregularities in the wood board, as was required in conventional methods in which the moisturizing step was carried out after the molding step, is not necessary. Moreover, since the water content of the obtained wood board is stable, it is not necessary to leave the wood board at room temperature for a long period of time to stabilize water content, as required in conventional manufacturing methods for wood boards.

In addition to adjusting the water content using a steam injection pressing step, it is also possible to adjust the water content by adding a water component when applying the binder, with the same effects being obtained.

In the manufacturing method for a wood board according to the present invention, it is preferable that a decorative veneer or the like be bonded to the surface of the molded material, or that various coatings be executed thereon. An oak veneer conventionally employed having a thickness within the range of 0.2 to 0.8 mm or the like may be suitably employed as the decorative veneer, for example.

The above explanation discussed only one example of the manufacturing method for a wood board in accordance with the present invention; a variety of applications are possible. For example, a wood board in which layers comprising wooden strands of different dimensions are layered together may be produced by means of the manufacturing method of the present invention, in addition to strand boards comprising only one layer. In such a case, after shaving the wooden strands, an operation in which the wooden strands are separated in accordance with the dimensions thereof such as the thickness, length, width, or the like, or an operation in which a binder is applied to the separated wooden strands, may be provided.

When the wood boards are to be used as flooring material or the like, it is preferable that they have the following structure. Namely, it is preferable such wood boards consist of a core layer, formed of strand board, and a surface layer, formed of oriented strand board and layered over at least one side of the core layer, this surface layer consisting of wooden strands which are thinner than the wooden strands which form the core layer. The wooden strands employed to form this surface layer preferably have an average thickness of 0.20 to 0.50 mm with an absolute value for the thickness of 0.08 to 0.60 mm, a length of 50 to 150 mm, an average width of 10 to 60 mm. Further, it is preferable to employ wooden strands for the core layer having an average thickness of 0.50 to 0.90 mm and an absolute value for the thickness of 0.50 to 1.50 mm, a length of 50 to 150 mm, an average width of 10 to 60 mm.

Furthermore, it is preferable that an operation in which the wooden strands are acetylated after being shaved be provided. In the case where the wooden strands are acetylated, it is preferable that after desiccating the wooden strands so as to reduce the water content to 3% or less, and preferably to 1% or less, the wooden strands be brought into contact with a vapor of acetic acid, acetic anhydride, chloroacetic acid, or the like, in the gas phase, and acetylation be carried out until an acetylation degree within the range of 12 to 20% is achieved.

Furthermore, a variety of operations may be included, where necessary, in the manufacturing method in accordance with the present invention, such as, for example, an operation in which the shaved wooden strands are stored, an operation in which, in the case in which the water content has become excessive as a result of the forced moisturizing, heating is conducted and adjustment to an appropriate water content is carried out, or the like.

In the first embodiment of the present invention, a molded material having a water content adjusted in the range of 5 to 15% upon the completion of the pressing treatment is obtained by shaving lumber to obtain wooden strands; applying a binder to the wooden strands; subjecting the binder coated wooden strands to forming; and conducting a steam injection pressing step in which thermal compression molding and moisturizing are carried out simultaneously. Thus, thermal compression molding and adjustment of the water content of the preformed material are carried out together. In addition, unlike conventional methods for manufacturing wood boards, the method of the present invention does not require a smoothing step to eliminate irregularities on the surface of the wood board by sanding, etc., nor an additional step for stabilizing the water content of the wood board by leaving it at room temperature for a long period of time. As a result, the manufacturing method for a wood board according to the present invention facilitates assembly line production, while the production process is simplified and the time and cost of manufacture are reduced. Moreover, because the water content of the molded material is in the range of 5 to 15% in the method according to the first embodiment of the present invention, it is possible to obtain a wood board of sufficient strength and high dimensional stability, in which minimal warping occurs in the product after shipping.

Further, in addition to the technique of adjusting the water content using a steam injection pressing step, it is also possible to adjust the water content by adding water when coating with a binder, with the same effects being obtained.

An explanation will now be made of the manufacturing method for a wood board according to the second embodiment of the present invention.

As shown in Table 2, the manufacturing method for a wood board according to the second embodiment of the present invention differs from the first embodiment in that prior to conducting the steam injection pressing step, binder is coated to the wooden strands after first adjusting the water content of the wooden strands to be adjusted in the range of 5 to 20%, and preferably in the range of 7 to 13%, or, alternatively, water is added to the wooden strands when applying the binder so that the water content is in the range of 5 to 20%, and preferably in the range of 7 to 13%.

Methods for adjusting the water content of the wooden strands in advance include: (1) a method wherein unseasoned timber having a water content in the range of 120 to 300% is desiccated to reduce the water content to 0 to 3%, and water is then added when coating with the binder so that the water content is brought into the range of 5 to 20%; (2) a method wherein unseasoned timber is desiccated to reduce the water content to 5 to 15%, and water is then added when coating with the binder so that the water content is brought into the range of 5 to 20%; and (3) a method wherein unseasoned timber is desiccated until the water content is in the range of 5 to 20%; among other methods as well.

TABLE 2

| Fabrication Steps (Embodiment 2) |
|---|
| 1. Providing strands |
| 2. Adjusting the water content of the strands to 5–20% prior to a steam injection pressing treatment |
| 3. Coating the strands with binder* |
| 4. Forming (orienting and laminating) the strands to provide preformed material |
| 5. Steam-injection-pressing the preformed material (a water content in a wood board is adjusted to 5–15% upon the completion of the pressing) |

*The steps 2 and 3 may be conducted simultaneously by mixing the strands with water.

The following experiment forms the basis for adjusting the water content of the wooden strands to be in the range of 5 to 20% prior to carrying out steam injection pressing.

Figure 5:
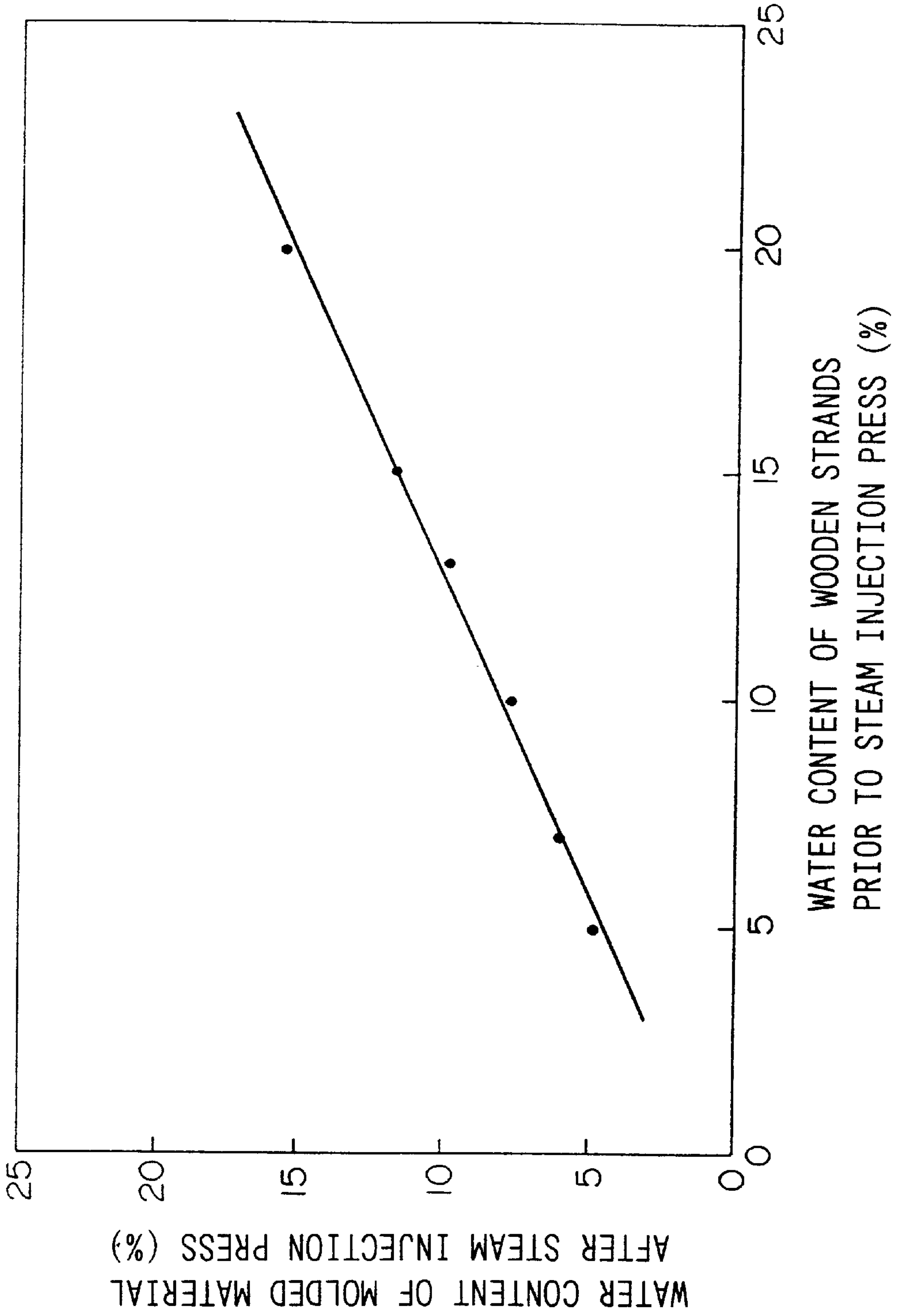
FIG. 5 is a graph showing the relationship between the water content of the wooden strands prior to the steam injection pressing step and the water content of the molded material after steam injection press.

The relationship between the water content of the wooden strands prior to steam injection pressing and the water content of the molded material after steam injection pressing was examined by subjecting wooden strands of varying water contents to steam injection pressing, and then measuring the water content of the molded material obtained thereafter. These results are shown in FIG. 5, which is a graph showing the relationship between the water content of the wooden strands prior to steam injection pressing and the water content of the molded material after steam injection press. From the graph in FIG. 5, it may be understood that by adjusting the water content of the wooden strands prior to steam injection pressing to be in the range of 5 to 20%, a wood board may be readily obtained thereafter which has a water content adjusted in the range of 5 to 15% upon the completion of the pressing treatment. Further, the time duration of the steam injection step can be shortened when all other conditions for carrying out the method of the second embodiment of the present invention are identical to those set forth for carrying out the manufacturing method for a wood board according to the first embodiment of the present invention.

When the water content of the wooden strands prior to carrying out the steam injection pressing is 5% or less, a shorter molding time is no longer possible, while when the water content exceeds 20%, the hardening of the molded material is impaired.

It is preferable to carry out the steam injection pressing step in the manufacturing method for a wood board according to the second embodiment of the present invention under the conditions as follows. Namely, it is preferable that the temperature of the heating plate 3 is in the range of 150 to 230° C., and preferably, in the range of 180 to 200° C. The duration of pressing is preferably set to be in the range of 30 to 300 seconds in the case where obtaining a molded material having a thickness of 12 to 13 mm, and, more preferably, is set to a time duration calculated by multiplying the desired thickness (mm) of the molded material by 3 to 13 (sec). The pressing pressure is preferably set in the range of 1 to 6 MPa, and preferably, in the range of 2 to 5 MPa, while the steam pressure is preferably in the range of 0.2 to 0.6 MPa. The duration of steam injection is preferably set to be in the range of 10 to 180 seconds, and more preferably in the range of 10 to 30 seconds.

In the manufacturing method for a wood board according to this second embodiment of the present invention, when carrying out the steam injection pressing step, binder is applied to wooden strands after adjusting the water content be in the range of 5 to 20%, or, alternatively, water is added prior to applying the binder to adjust the water content of the ligneous strands to be in the range of 5 to 20%. As a result, a wood board can be readily obtained following the steam injection pressing step which has a water content adjusted in the range of 5 to 15% upon the completion of the pressing treatment. Further, the time duration of the steam injection step can be shortened when all other conditions for carrying out the method of the second embodiment of the present invention are identical to those of the manufacturing method for a wood board according to the first embodiment of the present invention.

Next, the third embodiment of the present invention will be explained.

As shown in Table 3, the manufacturing method for a wood board according to the third embodiment of the present invention differs from the second embodiment in that prior to carrying out the steam injection pressing step, the water content of the wooden strands is adjusted to be in the range of 10 to 25%, and preferably in the range of 12 to 18%, and in that a thermal compression molding step (equivalent to the pressing treatment) is carried out in place of a steam injection pressing step after forming.

Methods for adjusting the water content of the wooden strands in advance include: (1) a method wherein unseasoned timber having a water content in the range of 120 to 300% is desiccated to reduce the water content to 0 to 3%, and water is then added when coating with the binder so that the water content is brought into the range of 10 to 25%; (2) a method wherein unseasoned timber is desiccated to reduce the water content to 5 to 15%, and water is then added when coating with the binder so that the water content is made to be in the range of 10 to 25%; and (3) a method wherein unseasoned timber is desiccated until the water content is in the range of 10 to 25%; among other methods as well.

TABLE 3

| Fabrication Steps (Embodiment 3) |
|---|
| 1. Providing strands |
| 2. Adjusting the water content of the strands to 10–25% prior to a thermal compression molding treatment |
| 3. Coating the strands with binder* |
| 4. Forming (orienting and laminating) the strands to provide preformed material |
| 5. Molding the preformed material by thermally compressing (a water content in a wood board is adjusted to 5–15% upon the completion of the pressing) |

*The steps 2 and 3 may be conducted simultaneously by mixing the strands with water.

The following experiment forms the basis for adjusting the water content of the wooden strands to be in the range of 10 to 25%.

Figure 6:
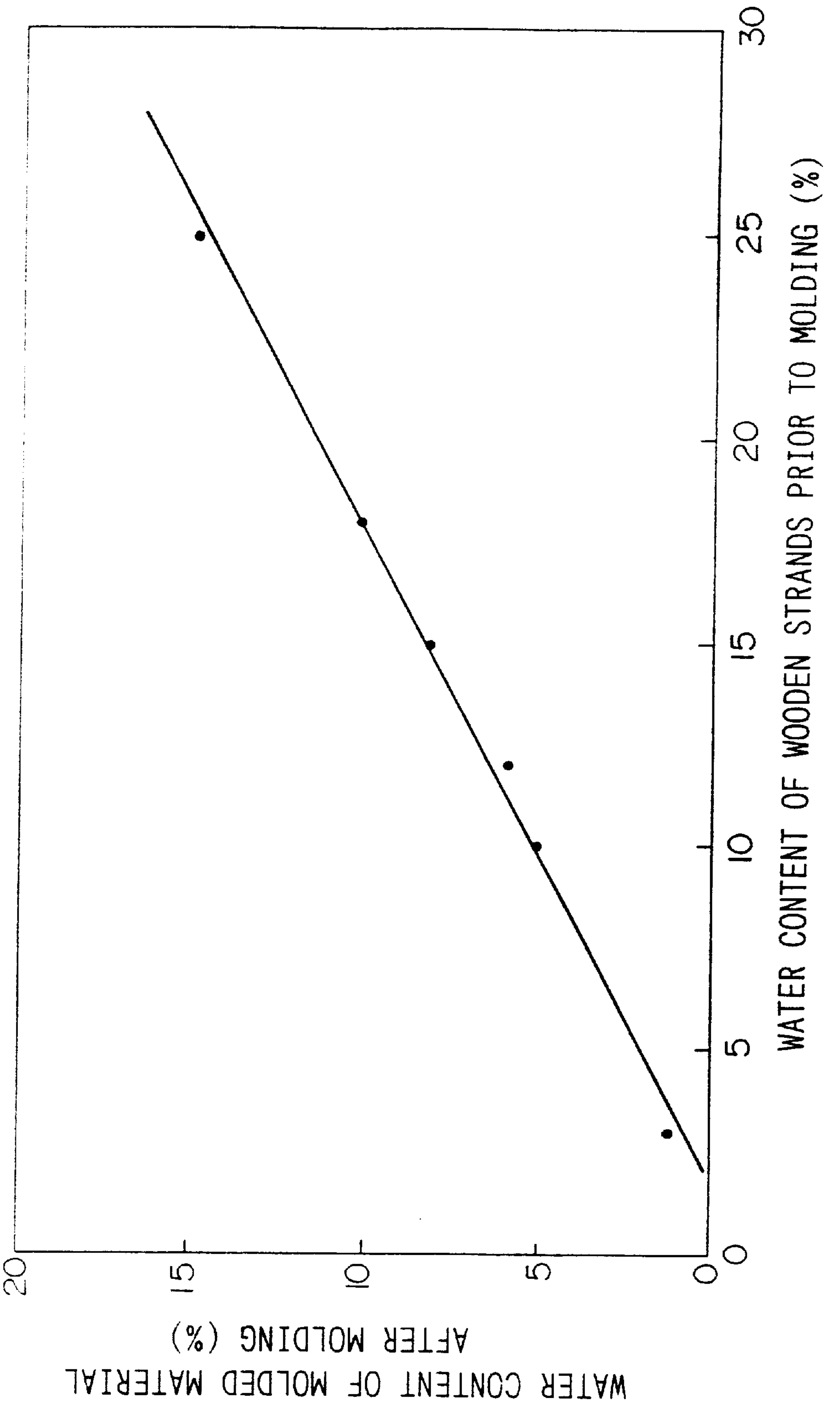
FIG. 6 is a graph showing the relationship between the water content of the wooden strands prior to molding and the water content of the molded material after molding.

The relationship between the water content of the wooden strands prior to the molding step and the water content of the molded material after the molding step was examined by subjecting wooden strands of varying water contents to a molding step and then measuring the water content of the molded material obtained following the molding step. These results are shown in FIG. 6, which is a graph showing the relationship between the water content of the wooden strands prior to molding and the water content of the molded material after molding. From the graph in FIG. 6, it may be understood that by adjusting the water content of the wooden strands prior to molding so as to be in the range of 10 to 25%, a wood board may be readily obtained thereafter which has a water content in the range of 5 to 15%.

In the molding step employed here, the preformed material obtained from the forming step is subjected to thermal compression molding using a thermal compression pressing apparatus without steaming, to obtain a molded material which has a water content adjusted in the range of 5 to 15% upon the completion of the molding treatment, and preferably, 6 to 15%.

It is preferable to carry out thermal compression in the manufacturing method for a wood board according to the third embodiment of the present invention under the conditions as follows. Namely, it is preferable that the temperature of the heating plate is in the range of 150 to 220° C., and preferably, in the range of 180 to 200° C. The duration of pressing is preferably set to be in the range of 180 to 300 seconds in the case where obtaining a molded material having a thickness of 12 to 13 mm, and, more preferably, is set to a time duration calculated by multiplying the desired thickness (mm) of the molded material by 5 to 20 (sec). The pressing pressure is preferably set in the range of 1 to 6 MPa, and preferably, in the range of 2 to 5 MPa.

In the manufacturing method for a wood board according to this third embodiment of the present invention, wooden strands are formed by shaving lumber, binder is applied to the wooden strands after adjusting the water content of the wooden strands to be in the range of 10 to 25%, or, alternatively, water is added when applying the binder to adjust the water content of the wooden strands to be in the range of 10 to 25%. Next, the binder coated wooden strands are subjected to forming, and a molded material having a water content adjusted in the range of 5 to 15% upon the completion of the molding treatment is obtained through a thermal compression molding step. As a result, a smoothing step to remove irregularities in the surface of the wood board by sanding, etc., and a step of stabilizing the water content by leaving the wood board at room temperature for a long period of time, as required in conventional manufacturing methods for wood boards, are unnecessary in the method according to the third embodiment of the present invention. As a result, the manufacturing process can be simplified, and time and costs reduced. Further, by applying a binder to the wooden strands after first adjusting the water content of the wooden strands to 10 to 25%, or, alternatively, adding water to the wooden strands when applying the binder so that the water content of the wooden strands is in the range of 10 to 25%, and then carrying out a molding step, a wood board which has a water content adjusted in the range of 5 to 15% upon the completion of molding is readily obtained.

Examples will now be utilized in order to provide better understanding of the present invention. These examples show one aspect of the present invention, and are not intended to limit this invention in any way, but may be varied provided they remain within the scope of the invention.

EXAMPLE 1

Wooden strands for the core layer were prepared from aspen wood, having a water content of 2%, a length within the range of 70 to 80 mm, a width of 2 to 30 mm, and an average thickness of 0.60 mm. Wooden strands for the surface layer were prepared from aspen wood, having a water content of 2%, a length within the range of 70 to 80 mm, a width within the range of 2 to 30 mm, and an average thickness of 0.30 mm. Each of these prepared wooden strands were placed inside a rotating drum, and were coated with a mixture of 10 parts by weight crude MDI (SUMDUR 44V20 produced by Sumitomo Bayer Urethane Co., Ltd.), 3 parts by weight phenol, and 2 parts by weight water repellent agent, with respect to 100 parts aspen.

Next, a forming step was carried out in which half of the wooden strands for the surface layer which had been coated with the binder as above, were dispersed so as to be approximately oriented in the same direction, and binder coated wooden strands for the core layer were then dispersed over the one surface thereof, while the remaining wooden strands for the surface layer were dispersed to the other surface thereof so as to be oriented in approximately the same direction. As a result, a layered article of length 2000 mm, width 1090 mm and thickness approximately 120 mm was obtained. This layered article was placed into a steam injection pressing apparatus, and subjected to thermal compression and moisturizing at a heating plate temperature of 190° C., a pressing duration of 3 minutes, a pressing pressure of 2 MPa, a steam pressure of 0.6 MPa, and a steam injection duration of 30 seconds. As a result, a wood board having a thickness of 13.5 mm and a water content of 5.83% was obtained.

Using this wooden material as a base, a veneer was attached to the surface thereof, with the surface veneer coated thereto. After finishing, an excellent flooring material was obtained which demonstrated warping of −9 mm with respect to a length of 1818 mm, and a flexural Young's modulus of $54\times10^2$ MPa.

EXAMPLE 2

Wooden strands for the core layer were prepared from aspen wood, having a water content of 2%, a length within the range of 70 to 80 mm, a width of 2 to 30 mm, and an average thickness of 0.60 mm. Wooden strands for the surface layer were prepared from aspen wood, having a water content of 2%, a length within the range of 70 to 80 mm, a width of 2 to 20 mm, and an average thickness within the range of 0.30 mm. Each of these prepared wooden strands were placed inside a rotating drum, and were coated with a mixture of crude MDI, phenol, and a water repellent agent in the same proportions as set forth in Example 1, while at the same time water was added to adjust the water content to 10%.

Next, a forming step identical to that carried out in Example 1 was performed, to obtain a layered article having a thickness of 120 mm. This layered article was then placed into a steam injection pressing apparatus, and subjected to a steam injection pressing at a temperature of 190° C., a pressing duration of 3 minutes, a pressing pressure of 2 MPa, a steam pressure of 0.6 MPa, and a steam injection duration of 25 seconds a the start of pressing. As a result, a wood board (size: 2090 mm×1090×13.5 mm) having a water content of 7.7% was obtained.

Using this wooden material as a base, the same floor material finishing process as performed in Example 1 was carried out to obtain an excellent flooring material which demonstrated warping of −4 mm with respect to a length of 1818 mm, and a flexural Young's modulus of $50\times10^2$ MPa.

EXAMPLE 3

Wooden strands for the core layer were prepared from aspen wood, having a water content of 2%, a length within the range of 70 to 80 mm, a width of 2 to 30 mm, and an average thickness of 0.60 mm. Wooden strands for the surface layer were prepared from aspen wood, having a water content of 2%, a length within the range of 70 to 80 mm, a width within the range of 2 to 20 mm, and an average thickness 0.30 mm. Each of these prepared wooden strands were placed inside a rotating drum, and were coated with a mixture of crude MDI, phenol, and a water repellent agent in the same proportions as set forth in Example 1, while water was added at the same time to adjust the water content to 15%.

Next, a forming step identical to that carried out in Example 1 was performed, to obtain a layered article having a thickness of 120 mm. This layered article was then placed into a thermal compression pressing apparatus, and subjected to thermal compression at a heating plate temperature of 180° C., a pressing duration of 3 minutes, and a pressing pressure of 2 MPa. As a result, a wood board (size: 2000 mm×1090×13.5 mm) having a water content of 8% was obtained.

Using this wooden material as a base, the same floor material finishing process as performed in Example 1 was carried out to obtain an excellent flooring material which demonstrated warping of −6 mm with respect to a length of 1818 mm, and a flexural Young's modulus of $47\times10^2$ MPa.

COMPARATIVE EXAMPLE

Wooden strands were prepared from aspen in the same manner as carried out in Example 1, with the exception that the water content of the wooden strands prior to thermal compression molding was adjusted to 3%. Each of the strands were placed in rotating drums and coated with a mixture of crude MDI, phenol resin and a water repellent agent in the same proportions as set forth in Example 1.

Next, a forming step identical to that carried out in Example 1 was performed, to obtain a layered article having a thickness of 120 mm. This layered article was then placed into a thermal compression pressing apparatus, and subjected to thermal compression molding at a heating plate temperature of 210° C., a pressure duration of 3 minutes, and a pressing pressure of 2 MPa. As a result, a wood board (size: 2000 mm×1090×13.5 mm) having a water content of 2% was obtained. In addition, when carrying out thermal compression molding here, steam injection was not carried out.

Using this wooden material as a base, the same floor material finishing process as performed in Example 1 was carried out to obtain a flooring material which demonstrated warping of −18 mm with respect to a length of 1818 mm, which was considerably greater than the amount of warping observed in the flooring material obtained in Examples 1 through 3.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by, persons of ordinary skill in the art having reference to this description. It is contemplated that all such changes and additional embodiments are within the spirit and true scope of the invention as claimed.

What is claimed is:

1. A method for producing a wood board, comprising the steps of:

providing wooden strands;

applying a binder to the wooden strands, while at the same time adding water to adjust water content of the wooden strands to 10 to 25%;

subjecting the wooden strands and the binder applied to the wooden strands to a forming process to form a preformed material; and carrying out thermal compression molding of the preformed material while reducing the water content thereof so as to obtain a molded material having a water content of 5 to 15% upon the completion of the thermal compression molding.

2. A method for producing a wood board according to claim 1, wherein said wood board has a core layer and a surface layer.

3. A method for producing a wood board according to claim 2, wherein an average value of thickness of the strands constituting the surface layer is 0.20 to 0.50 mm, with an absolute value for the thickness of 0.08 to 0.60 mm.

4. A method for producing a wood board according to claim 2, wherein an average value of thickness of the strands constituting the core layer is 0.60 to 0.90 mm, with an absolute value for the thickness of 0.50 to 1.50 mm.

5. A method for producing a wood board according to claim 2, wherein the strands constituting the surface layer is thinner than the strands constituting the core layer.

6. A method for producing a wood board according to claim 1, wherein the binder comprises a material selected from the group consisting of a foaming binder, a non-foaming binder, and a mixture of a foaming binder and a non-foaming binder.

7. A method for producing a wood board according to claim 1, wherein the binder comprises a mixture of a foaming binder and a non-foaming binder with a mixing ratio in the range of 4:1 to 1:4.

8. A method for producing a wood board, comprising the steps of:

providing wooden strands;

applying a binder to the wooden strands;

subjecting the wooden strands and the binder applied to the wooden strands to a forming process to form a preformed material;

enclosing the preformed material in a seal; and conducting steam injection pressing in which the preformed material within the seal is subjected to thermal compression molding while being moisturized, the steam being sealed within the seal.

* * * * *

UNITED STATES PATENT AND TRADEMARK OFFICE

CERTIFICATE OF CORRECTION

PATENT NO. : 6,129,871

DATED : October 10, 2000

INVENTOR(S) : Satoshi SUZUKI, et al.

It is certified that error appears in the above-indentified patent and that said Letters Patent is hereby corrected as shown below:

On the front page of the patent, please insert the foreign priority data information as follows:

--Japanese Patent Application No. 8-139252, filed May 31, 1996 and Japanese Patent Application No. 9-014348, filed January 28, 1997--

Signed and Sealed this

Fifteenth Day of May, 2001

Attest:

NICHOLAS P. GODICI

Attesting Officer

*Acting Director of the United States Patent and Trademark Office*